United States Patent [19]

Happach

[11] Patent Number: 4,947,285

[45] Date of Patent: Aug. 7, 1990

[54] REVERSING CIRCUIT FOR DIRECTION REVERSAL IN DIRECT CURRENT DRIVES

[75] Inventor: Anton Happach, Munich, Fed. Rep. of Germany

[73] Assignee: Schaltbau Gesellschaft mbH, Munich, Fed. Rep. of Germany

[21] Appl. No.: 332,451

[22] PCT Filed: Jul. 31, 1987

[86] PCT No.: PCT/EP87/00421

§ 371 Date: Mar. 8, 1989

§ 102(e) Date: Mar. 8, 1989

[87] PCT Pub. No.: WO88/02179

PCT Pub. Date: Mar. 24, 1988

[30] Foreign Application Priority Data

Sep. 9, 1986 [DE] Fed. Rep. of Germany ....... 3630657

[51] Int. Cl.[5] .......................... H02J 1/00; H01H 5/00

[52] U.S. Cl. .................................... 361/245; 318/256; 318/300; 335/426; 335/136; 335/159; 335/162

[58] Field of Search ............... 361/245, 246, 142, 189, 361/191, 206; 335/106, 107, 119, 124, 126, 131, 136, 159, 162, 177, 184, 186, 196, 267, 268; 307/125, 127, 146; 200/1 V, 275; 320/25, 26; 318/256, 289, 300, 756, 763

[56] References Cited

U.S. PATENT DOCUMENTS

| | | | |
|---|---|---|---|
| 427,237 | 5/1890 | Kissell | 335/136 X |
| 1,847,081 | 3/1932 | Cook | 318/263 |
| 2,821,639 | 1/1958 | Bright et al. | 361/245 X |
| 3,264,529 | 8/1966 | Lowry | 335/139 X |
| 3,694,715 | 9/1972 | Van Der Linde et al. | 318/139 |
| 3,815,060 | 6/1974 | Turnbull | 335/133 |
| 4,048,600 | 9/1977 | Dietrich | 335/128 |

FOREIGN PATENT DOCUMENTS

| | | |
|---|---|---|
| 1175322 | 8/1964 | Fed. Rep. of Germany . |
| 3201652A1 | 8/1983 | Fed. Rep. of Germany . |

*Primary Examiner*—M. H. Paschall
*Assistant Examiner*—David Osborn
*Attorney, Agent, or Firm*—Christie, Parker & Hale

[57] ABSTRACT

For the purpose of achieving an efficient and long-lived switching contact making on the basis of a structural design saving space and material, a reversing circuit for direction reversal in the case of direct current drives comprises four single-pole contactors which are arranged in a square and which are provided with coils 1 and with contact bridges 2 as well as four contact pieces 3 for connecting the outer terminals with fixed contacts formed by said contact pieces 3, the contact pieces 3 being arranged on one side of the coils in a square within one plane.

4 Claims, 1 Drawing Sheet

REVERSING CIRCUIT FOR DIRECTION REVERSAL IN DIRECT CURRENT DRIVES

BACKGROUND OF THE INVENTION

1. Field of the Invention

The present invention refers to a reversing circuit for direction reversal in the case of direct current drives.

2. Description of the Prior Art

German-Offenlegungssohrift 24 18 930 discloses a direct current operated, electromagnetic reversing circuit comprising two oppositely controlled switches which are constructed as switchover contactors and which are each provided with two-pole contact bridges, it being selectively possible to establish a connection between the two-pole contact bridges and outer terminals of the reversing circuit via fixed contacts and between the two-pole contact bridges and additional outer terminals. This known reversing circuit with switch-over contactors has a comparatively complicated structure and requires much space and in view of the use of normally closed contacts. For the purpose of conducting and switching the full electric power, it is also limited with regard to its switching power and its service life.

German-pat 525 108 refers to a U-shaped supporting bar for a plurality of relays, said supporting bar being formed in one piece together with the relay yoke and the relay core member.

SUMMARY OF THE INVENTION

In comparison with this prior art, the present invention is based on the task of further developing a reversing circuit of the type mentioned at the beginning in such a way that an efficient and long-lived switching contact making is achieved on the basis of a structural design of the reversing circuit saving space and material.

The reversing circuit according to the invention uses exclusively normally open contacts for the purpose of contact making so that high powers can be switched and a long service life of the contacts is obtained. The arrangement of the single-pole contactors in connection with the adequate arrangement oF the contact pieces permits a very space-saving mode of arrangement of the outer terminals and of the fixed contacts and avoids the use of bus bars for interconnecting the terminals and the fixed contacts.

DESCRIPTION OF THE PREFERRED EMBODIMENTS

One preferred embodiment will be explained in detail hereinbelow while making reference to the drawing enclosed, in which.

Figure 1:
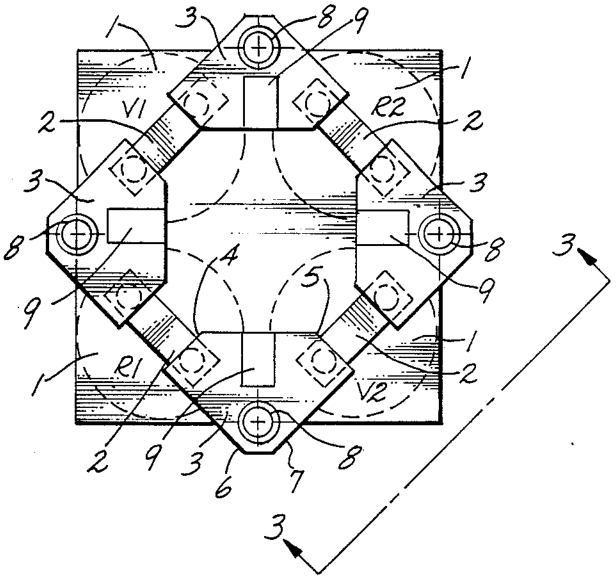
FIG. 1 shows a top view of the reversing circuit according to the invention.

The reversing circuit, a top view of the contact side of which is shown in FIG. 1, is provided with four single-pole contactors $V_1$, $V_2$, $R_1$, $R_2$, which are arranged in a square. Each of the contactors $V_1$, $V_2$, $R_1$, $R_2$ is provided with a coil 1 moving contact bridges 2 via plunger-type armature magnets. Two of the single-pole contactors $V_1$, $V_2$ serve to effect forward passage by means of a direct current drive (not shown) adapted to be connected to a direct current source via the single-pole contactors, whereas two other single-pole contactors $R_1$, $R_2$ serve to effect reverse passage by means of the direct current drive.

Each pair of the coils 1, which are arranged in a square. has provided between them one contact piece 3. Hence, the four contact pieces 3 are also arranged in a square. Each of said contact pieces 3 has a shape corresponding essentially to the shape of a right-angled, isosceles triangle. Acute-angled corners 4, 5 of the isosceles triangular contact pieces are cut off perpendicularly to the legs 6, 7 of said contact pieces. Bolts 8 for the outer terminals are arranged in the riqht-angled corners of the triangular contact pieces 3. Two of the bolts 8, which are arranged in opposite relationship with each other, are connected to the direct current source (not shown). The two other bolts 8 are connected to a direct current drive (which is not shown either). The contact pieces 3 carry fixed contacts at their cut-off, acute-angled corners 4, 5, said fixed contacts being preferably defined by areas of the contact pieces 3 themselves, but they can also be formed by contact surfaces attached to said contact pieces 3. When the coils 1 are excited, the respective contact bridges 2 will come into contact with the fixed contacts of the contact pieces 3 arranged on both sides of the excited coil 1, as can be seen especially from FIG. 3, in which the contact bridge 2 is out of contact with the contact pieces 3 in the non-excited condition of the coil 1.

Each contact piece 3 carries a blow magnet 9 which is located on the bisecting line of the right angle on the level of the fixed contacts.

Figure 2:
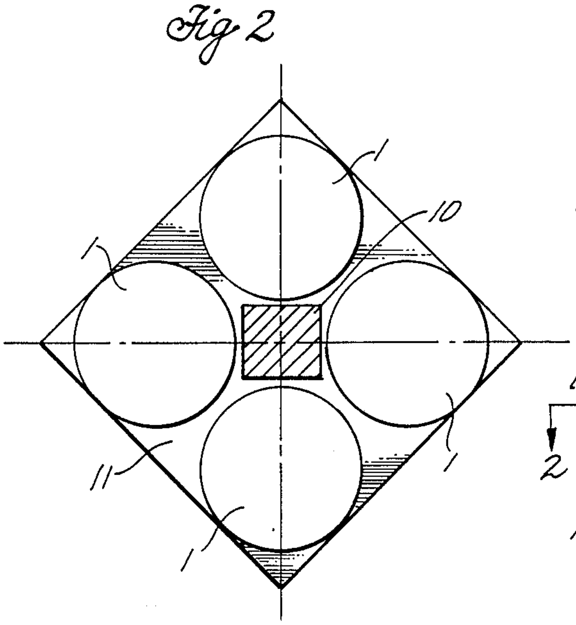
FIG. 2 shows a cross-sectional view taken along line 2—2 of FIG. 3 the reversing circuit according to the invention.

As can be seen in FIG. 2, the coils 1 are arranged in the area of the corners of a square magnetic yoke plate 11, the centre of said plate 11 being provided with a return member 10.

Figure 3:
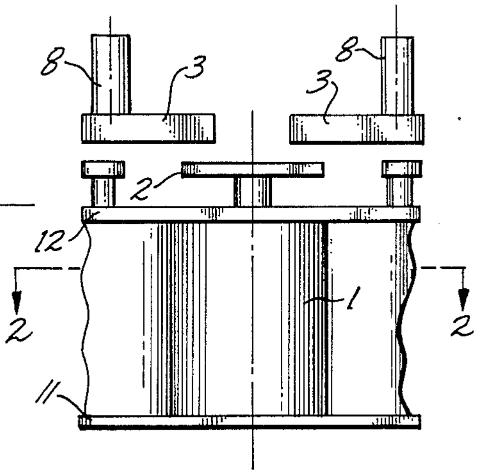
FIG. 3 shows a side view taken along line 3—3 of FIG. 1 of the reversing circuit according to the invention.

As can be seen in FIG. 3, an additional plate 12 is positioned above the coils 1 and closes the respective magnetic circuits of the single-pole contactors. This second plate 12 is provided with holes for plunqer-type armature magnet driving elements of the contact bridges 2.

The reversing circuit comprises contactors which are provided with contactor coils 1 for moving two-pole contact bridges 2 with fixed contacts connected to outer terminals. The circuit is provided with four single pole contactors which are arranged in a square. For connecting outer terminals to the fixed contacts, four contact pieces 3 are arrange don one side of the contactor coils 1 in a square within a plane. The contact pieces 3 have essentially the form of right angled isosceles triangles whose acute angled corners 4, 5 are cut off perpendicularly to the associated catheters. The triangles carry in their right angled corners bolts 8 for the outer terminals, and at their cut-off, acute angled corners, the fixed contacts for the contact bridges 2 of the single pole contractors located between the triangles. Two magnetic yoke plates 11 and a magnetic return member 10 are arranged in parallel to and between the contactor coils 1. The magnetic return member has the shape of a square bolt and is used for guiding the magnetic flux of the single pole contactors. Each contact piece 3 has arranged thereon a blow magnet 9 which is located on the bisecting line of the right angles of the contact piece 3 on the level of the fixed contacts.

I claim:

1. A reversing circuit for reversing an operating direction of a DC drive system, comprising four single-pole relays (V1, V2, R1, R2) each including a solenoid (1) for moving a two-pole contact bridge (2), and fixed contacts (4,5) connected to exterior terminals (8), characterized in that said four single-pole relays (V1, V2, R1, R2) are arranged in a square configuration, and that four contact pieces (3) for electrically connecting said exterior terminals (8) to said fixed contacts (4,5) are arranged between the solenoids (1) of two respective ones of said four single-pole relays (V1, V2, R1, R2) in a common plane in a square configuration.

2. A reversing circuit according to claim 1, characterized in that said contact pieces (3) are substantially shaped as right-angled isosceles triangles with acute-angled corners (4,5) which are cut off perpendicular to the associated catheters, and that carry bolts (i) in right angled corners acting as said exterior terminals, and said right angled triangles further carry said fixed contacts (2) (V1, V2, R1, R2) in their cut-off corners for contacting said contact bridges (4,5).

3. A reversing circuit according to claim 1 or 2, characterized in that said relay solenoids (1) are disposed in the corner areas of two magnet yoke plates located respectively above and below said relay solenoids (1), and that a magnetic flux guide member (10) in the form of a square bolt extending parallel to said relay solenoids (1) is provided between said two magnet armature plates (11,12) for guiding the magnetic flux of said single-pole relays.

4. A reversing circuit according to claim 1 or claim 2, characterized in that a blow magnet (9) is provided for each contact piece (3) on a bisecting line of a right angle of said contact piece (3) and a level of said fixed contacts.

* * * * *

UNITED STATES PATENT AND TRADEMARK OFFICE

CERTIFICATE OF CORRECTION

PATENT NO. : 4,947,285

DATED : August 7, 1990

INVENTOR(S) : Anton Happach

It is certified that error appears in the above-identified patent and that said Letters Patent is hereby corrected as shown below:

Column 1, line 13, change "switchover" to -- switch-over --.
Column 1, line 22, change "contacts. For" to -- contacts for --.
Column 1, line 44, after "arrangement" change "oF" to -- of --.

Column 2, line 8, after "square" and before "has" change the period to a comma.
Column 2, line 51, change "arrange don" to -- arranged on --.
Column 2, line 56, after "associated" change "catheters" to -- cathetus --.
Column 2, line 60, change "contractors" to -- contactors --.

Column 3, line 18, after "associated" change "catheters" to -- cathetus --.

Signed and Sealed this

Twenty-sixth Day of May, 1992

*Attest:*

DOUGLAS B. COMER

*Attesting Officer*

*Acting Commissioner of Patents and Trademarks*